Aug. 7, 1962 L. M. MINSK ETAL 3,048,487

BASIC MORDANTS DERIVED FROM THE REACTION BETWEEN MALEIC ANHYDRIDE INTERPOLYMERS AND DISUBSTITUTED DIAMINES

Filed June 5, 1957

HYMAN L. COHEN
LOUIS M. MINSK
INVENTORS

BY Daniel I. Mayne
Lawrence H. Willis
ATTORNEYS

United States Patent Office 3,048,487

Patented Aug. 7, 1962

3,048,487

BASIC MORDANTS DERIVED FROM THE REACTION BETWEEN MALEIC ANHYDRIDE INTERPOLYMERS AND DISUBSTITUTED DIAMINES

Louis M. Minsk and Hyman L. Cohen, Rochester, N.Y., assignors to Eastman Kodak Company, Rochester, N.Y., a corporation of New Jersey Filed June 5, 1957, Ser. No. 663,810

3 Claims. (Cl. 96—84)

This invention relates to photography, and more particularly, to photographic elements comprising a plurality of layers, at least one of which contains a basic mordant.

It is known that photographic elements intended for various purposes, such as imbibition printing, color printing, etc., can contain various mordanting materials which are intended to prevent migration of coloring materials or dyes, or to adsorb dyes from various photographic treating solutions. Many of these mordanting materials are organic in nature and contain long linear chains having basic or acidic groups attached thereto, depending upon the particular coloring materials or dyes which are to be mordanted.

We have found a new class of organic resinous mordanting materials which are particularly useful in imbibition printing or the preparation of color prints having dyes incorporated therein, which would normally migrate or wander in the absence of our novel mordanting materials.

It is, therefore, an object of our invention to provide mordanting materials which can be employed in photography. Another object is to provide or illustrate methods of using these mordanting materials. Still another object is to provide novel resinous materials and a method of preparing these resinous materials. Other objects will become apparent from a consideration of the following description and examples.

Photographic elements which are useful according to our invention are illustrated in the accompanying drawing where:

Figure 1:
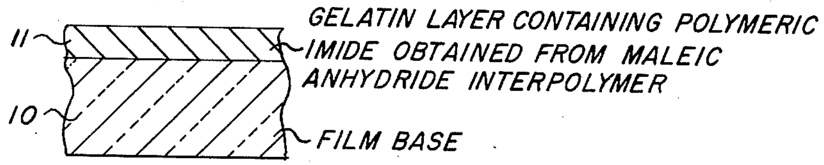
FIGURE 1 is a sectional view of a transfer blank according to our invention.

The novel mordanting materials of our invention are derived by reacting a maleic anhydride interpolymer, or a closely related derivative thereof, with an unsymmetrically disubstituted diamine. These novel mordants are distinguished from a number of previously employed mordants in that they are substantially free of any residual acid groups. The reaction of these interpolymers with the disubstituted diamines results in an intermediate resinous material which does contain acid groups or ester groups and carboxylic amide groups. These intermediate products are dehydrated by treatment with a dehydrating agent, such as a carboxylic anhydride (e.g., acetic anhydride, propionic anhydride, etc.) by heating, or both for a sufficient period of time to cause the formation of imide groups from the carboxylic amide groups. The means of accomplishing this imidization have been previously described in the prior art and are illustrated in detail in the examples given below.

It is known that maleic anhydride does not form homopolymers under the usual conditions of polymerization, although it does form interpolymers with a wide variety of monoethylenically-unsaturated compounds of the vinyl and vinylidene type. Maleic anhydride generally enters these polymerizations in a molar ratio of 1:1 so that about 50% of the units of the final polymer are derived from maleic anhydride.

Particularly useful interpolymers of maleic anhydride, or its substituted derivatives, include those polymers represented by the following general formula:

(I)

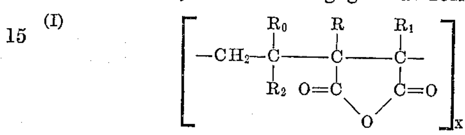

wherein R, $R_0$ and $R_1$ each represents a hydrogen atom or a lower alkyl group, such as methyl, ethyl, etc., $R_2$ represents a hydrogen atom, an alkyl group (e.g., methyl, ethyl, etc.), a monocyclic aryl group (e.g., phenyl, tolyl, etc.) or a carbalkoxyl group (e.g., carbomethoxyl, carbethoxyl, etc.) and $x$ represents a large whole number, such as a whole number greater than about 10. Maleic anhydride interpolymers included by Formula I above have been previously described in numerous prior art references. Such interpolymers are generally derived from monomers, such as ethylene, styrene, isobutylene, acrylic esters, etc. Instead of using maleic anhydride itself in the preparation of these interpolymers, it is possible to use maleic or fumaric acid esters to equal advantage, although the reaction times are generally lengthened in those cases where the ester derivatives are used in place of the anhydride. In like manner, the interpolymers can be obtained from maleic acid or fumaric acid.

According to our invention, interpolymers of the type represented by Formula I above (including the compounds of Formula I or the derivatives illustrated above) are reacted with disubstituted diamines of the type represented by the following general formula:

(II)

$$\begin{matrix} R_3 \\ \diagdown \\ \end{matrix} N—R_5—NH_2 \quad (R_3, R_4 \text{ on } N)$$

$$(R_3)(R_4)N—R_5—NH_2$$

wherein $R_3$ and $R_4$ each represents a lower alkyl group (e.g., methyl, ethyl, n-propyl, n-butyl, etc.) or $R_3$ and $R_4$ together represent the atoms necessary to complete a piperidine or morpholine ring, and $R_5$ represents an alkylene group (e.g, ethylene, propylene, butylene, pentylene, etc., especially an alkylene group containing 2 to 3 carbon atoms).

The reaction of the interpolymers of Formula I with the diamines of Formula II need not be on an equimolar basis, although generally it is advisable to use sufficient diamine to insure reaction of substantially all (i.e., 100%), but at least about 75% to 80%, of the anhydride units in the interpolymer. Where the interpolymer used contains acid groups or ester groups in place of the anhydride units illustrated in Formula I, it is generally preferable to use sufficient amine to react with all of these free acid groups or ester groups. As indicated above, the first step in the reaction of the compounds of Formula I with those of Formula II leads to the formation of derived polymers containing carboxylic amide groups as a result of the reaction of the primary amino group of the compounds of Formula II with the anhydride groups of the polymers represented by Formula I. Further heating either alone or in the presence of a dehydrating agent, such as acetic anhydride, propionic anhydride, etc., leads to the formation of the mordants of our invention which can be represented by the following general formula:

(III)

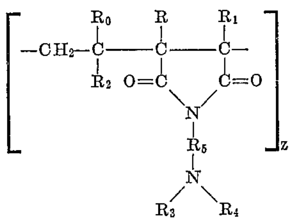

wherein R, $R_0$, $R_1$, $R_2$, $R_3$, $R_4$ and $R_5$ each have the values given above and $z$ represents a large whole number, such as a whole number greater than about 10 ($z$ may be the same as $x$, depending upon the molar quantity of the diamine used, which is used in an amount as indicated above to react with from about 75% to 80% of the anhydride units, as a minimum).

Under the above preparative conditions the product will contain combined acid. This acid may be removed by treatment with a base. Alternatively, the material may be prepared by the dimethyl formamide procedure of Example 15 in which the product is obtained directly as the free base. The free base by either of these procedures is represented by Formula III. All, or a portion of all, of the residual anhydride units are hydrolyzed to carboxylic acid units under the above conditions.

The preparation of the novel mordants of our invention can be carried out in the presence of an inert diluent, such as dioxane, benzene, acetone, etc. The first step of the reaction resulting in the formation of carboxylic amide units in the interpolymer is generally carried out at about the temperature of the steam bath. After the addition of the dehydrating agent, the heating is continued for a period of time sufficient to cause reaction of most of the anhydride, acid or ester groups present in the interpolymer. The preparation of imides has been previously illustrated in U.S. Patent 2,313,565. The imides of Patent 2,313,565 generally contain ether groups attached to the linear polymer chain, and we have found that such groups generally cause color formation in the resulting imide polymers. In our process, such ether groups and undesirable free acid groups are avoided.

While the mordants of our invention as illustrated in Formula III above are in the form of their free bases, these mordants are customarily used in photography in aqueous acid solutions so that at least a portion of the polymer units are in the following form:

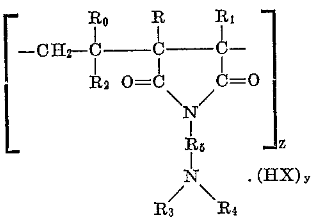

wherein R, $R_0$, $R_1$, $R_2$, $R_3$, $R_4$, $R_5$ and $z$ each have the values given above, X represents an acid radical (inorganic or organic), such as lactyloxy, glycolyloxy, acetoxy, propionoxy, alkanesulfonoxy (e.g., methanesulfonoxy, ethanesulfonoxy, n-butanesulfonoxy, etc., especially such radicals containing from 1 to 4 carbon atoms), chloride, etc. and $y$ represents at least $\frac{1}{2}z$ but not more than $z$. Of course, when a carboxylic anhydride is used as the dehydrating agent as shown above, some of the free acid formed forms an acid-addition salt with the polymeric imide. In those cases where the free base or imide is obtained as such, sufficient acid (in aqueous form) can be added until the aqueous solution is rendered acid. The amount of acid needed for this purpose will vary, depending on the particular acid and the intended use of the mordant. In general, sufficient acid is present or used to give a pH below about 6.0.

While maleic anhydride generally enters polymerizations in a 1:1 ratio with a comonomer, sometimes it interpolymerizes in smaller ratios, such as 1:2 (i.e., 33% maleic anhydride units). Maleic anhydride derivatives, such as maleic or itaconic esters, frequently interpolymerize at various ratios (U.S. Patent 2,298,039). The useful interpolymers of Formula I above can contain between about 33 and 50 mol. percent maleic anhydride (or derivative) units. Especially useful interpolymers are those containing a molar ratio of 1:1 of maleic anhydride units.

Our invention can be illustrated by the following examples:

EXAMPLE 1

*Preparation of the Imide of the Styrene-Maleic Anhydride Interpolymer*

A solution of 40.4 g. (0.2 mole) of styrene-maleic anhydride interpolymer ($\eta$=0.21) in 250 ml. of dioxane was added dropwise with stirring to a solution of 20.4 g. (0.2 mole) of $\gamma$-dimethylaminopropylamine in 250 ml. of dioxane while this was being heated on a steam bath. A white granular precipitate separated during the addition (time—one-half hour). Following addition, heating and stirring were continued for an additional hour. Fifty-one grams (0.5 mole) of acetic anhydride was then added in one batch, complete solution taking place within ten minutes. The solution was heated for an additional hour, then allowed to cool.

On pouring into three liters of ether, a cream-colored, fibrous precipitate formed. This was washed three times with ether, filtered, and dried under vacuum, leaving 42 g. of cream-colored solid which was soluble in dilute acetic acid and insoluble in alkali.

*Analysis.*—C, 72.4, 72.0; H, 7.6, 7.7; N, 8.2, 8.4; acetyl, 3.8, 4.1.

EXAMPLE 2

*Imide of the Methyl Methacrylate-Maleic Anhydride Interpolymer*

(A) PREPARATION OF THE METHYL METHACRYLATE-MALEIC ANHYDRIDE INTERPOLYMER

A mixture of 50 g. (0.5 mole) freshly distilled methyl methacrylate and 49 g. (0.5 mole) of maleic anhydride, 100 ml. of purified benzene and 1 g. of benzoyl peroxide was heated on a steam bath. Within one hour, the material had polymerized to a dark red solid. The mixture was heated for four more hours. The benzene was decanted and the polymer dissolved in 150 ml. of acetone giving a viscous solution. This was poured into 3 liters of ether giving a pink powder which was washed twice with ether, filtered, and dried under vacuum. Yield—67 g.

| | Calculated | Found |
|---|---|---|
| C | 57.0 | 57.1 |
| H | 6.5 | 6.6 |
| Methoxyl | 21.7 | 21.9 |

(B) PREPARATION OF $\gamma$-DIMETHYLAMINOPROPYLIMIDE OF THE METHYL METHACRYLATE-MALEIC ANHYDRIDE INTERPOLYMER To a solution of 9.2 g. (0.1 mole) of $\gamma$-dimethylaminopropylamine in 100 ml. of dioxane being heated on a steam bath with stirring, was added slowly a solution of 19.8 g. (0.1 mole) of maleic anhydride-methyl methacrylate interpolymer in 100 ml. of dioxane. A white precipitate formed immediately. After addition of the amine, stirring and heating were continued for two more hours. With continued heating and stirring, 30.6 g. (0.3 mole) of acetic anhydride was added. Solution took place in 15 minutes. Heating and stirring were continued for an additional hour. The cooled solution was poured into two liters of ether, precipitating a light gray granular powder. This was washed twice with ether, filtered, and dried under vacuum. Yield—21 g.

| | Calculated | Found |
|---|---|---|
| C | 58.3 | 58.2 |
| H | 8.8 | 8.9 |
| Acetyl | | 0.3 |

EXAMPLE 3

A solution of 20.3 g. (0.15 monomeric mole) of styrene-maleic anhydride interpolymer in 300 ml. of acetone was added over a period of one hour to a stirred, refluxing solution of 20 g. (0.15 mole) of γ-diethylaminopropylamine in 300 ml. of acetone. After stirring or refluxing for an additional hour, the white precipitate was almost colloidal in nature.

After adding 30 g. (0.3 mole) of acetic anhydride to the suspension, the mixture was stirred under reflux for an additional hour by which time the precipitate had redissolved. The mixture was cooled and poured into 3 liters of ether. Washing 3 times with ether caused the precipitate to harden. It was filtered and dried under vacuum giving 45 g. of polymer.

*Analysis.*—Calc'd for C, 71.8; H, 8.55; N, 8.8. Found: C, 71.0, 71.4; H, 8.3, 8.2; N, 8.0, 8.3; Acetyl, 1.0, 1.0.

EXAMPLE 4

The imide of this example was obtained in exactly the manner described in Example 3 above, except that the diamine was replaced by 13.2 g. (0.15 mole) of β-dimethylaminoethylamine. It was obtained in a yield of 33 g.

*Analysis.*—Calc'd for C, 70.7; H, 7.35; N, 10.0. Found: C, 70.1, 70.5; H, 6.7, 7.0; N, 9.6, 9.8; Acetyl, 0.2.

EXAMPLE 5

The imide of this example was obtained in exactly the manner described above in Example 3, except that the diamine was replaced by 17.9 g. (0.15 mole) of γ-dimethylaminobutylamine. It was obtained in a yield of 45 g.

*Analysis.*—Calc'd for C, 70.05; H, 7.94; N, 8.85. Found: C, 68.5, 68.2; H, 8.7, 8.8; N, 7.3, 7.1; Acetyl, 4.1, 4.3.

EXAMPLE 6

This imide was obtained in exactly the manner described in Example 3 above, except that the diamine was replaced by 19.2 g. (0.15 mole) of ω-dimethylaminopentylamine. It was obtained in a yield of 50 g.

*Analysis.*—Calc'd for C, 71.5; H, 8.3; N, 8.6. Found: C, 67.7, 67.4; H, 8.3, 8.0; N, 7.1, 7.1; Acetyl, 2.6.

EXAMPLE 7

This imide was obtained in exactly the manner described in Example 3 above, except that the diamine was replaced by 22 g. (0.15 mole) of γ-piperidinopropylamine. It was obtained in a yield of 45 g.

*Analysis.*—Calc'd for C, 73.7; H, 8.0; N, 8.4. Found: C, 73.3, 72.9; H, 7, 7.5; N, 7.8, 8.2; Acetyl, 1.0.

EXAMPLE 8

This imide was obtained according to the process of Example 3 above except that the diamine was replaced by 30 g. (0.17 mole) of β-di-n-butylaminoethylamine. After preparation of the polymer, it was precipitated in 5 percent ammonia.

*Analysis.*—Calc'd for C, 74.3; H, 8.9; N, 7.88. Found: C, 73.3, 73.4; H, 9.1, 8.9; N, 7.8, 7.4.

EXAMPLE 9

*γ-Dimethylaminopropylimide of Methyl Methacrylate-Maleic Anhydride Interpolymer*

The methyl methacrylate-maleic anhydride interpolymer used in this example was prepared exactly as described in Example 2 above. To a solution of 19 g. (0.19 mole) of γ-dimethylaminopropylamine in 300 ml. of acetone was added a solution of 30 g. (0.15 mole) of the above methyl methacrylate-maleic anhydride interpolymer in 300 ml. of acetone. The mixture was then treated and the product isolated as described above in Example 3. Yield: 34 g.

*Analysis.*—Calc'd for 2/1 polymer: C, 60.0; H, 7.85; N, 7.35. Found: C, 58.7, 58.8; H, 8.0, 7.9; N, 5.9, 6.0; Acetyl, 1.5, 1.8.

EXAMPLE 10

This imide was obtained according to the process of Example 3 above except that the maleic anhydride interpolymer was replaced by 30 g. (0.14) mole of p-vinyltoluene-maleic anhydride interpolymer. It was separated exactly as described in Example 3. Yield: 36 g.

*Analysis.*—Calc'd for C, 70.7; H, 7.95; N, 8.95. Found: C, 71.0; H, 8.0; N, 8.3; Acetyl, 2.6.

EXAMPLE 11

*γ-Dimethylaminopropylimide of Styrene-Itaconic Anhydride Interpolymer*

This imide was obtained according to the process of Example 3 above except that the maleic anhydride interpolymer was replaced by 14 g. (0.065 mole) of styrene-itaconic anhydride interpolymer and the diamine was replaced by 10 g. (0.1 mole) of γ-dimethylaminopropylamine. Yield: 20 g.

*Analysis.*—Calc'd for C, 70.5; H, 7.95. Found: C, 70.5, 70.5; H, 7.8, 8.0; Acetyl, 2.1.

EXAMPLE 12

A mixture of 104 g. (1.0 mole) of styrene, 172 g. (1.0 mole) of diethylfumarate and 1 g. of benzoyl peroxide was heated for 24 hours in a 60° C. bath giving a very viscous product. This was dissolved in seven volumes of acetone and precipitated in hexane giving a soft product which slowly hardened on washing with more hexane. The product was dried under vacuum giving a yield of 143 g.

*Analysis.*—C, 71.4, 71.5; H, 7.3, 7.4; Inherent viscosity 0.39.

This carbon analysis indicated a 55.7 mole percentage of styrene.

A solution of 20 g. of this polymer in 190 ml. of γ-dimethylaminopropylamine was heated for 24 hours in a steel bomb at 180–200° C. and cooled. Following dilution of the reaction mixture with 100 ml. of acetone, the product was precipitated and washed in hexane, then dried under vacuum. It was redissolved in acetone and reprecipitated in hexane in order to remove traces of amine. There remained 19 g. of fibrous product, soluble in dilute acetic acid.

*Analysis.*—C, 71.2, 71.4; H, 7.6, 7.7; N, 6.6, 6.7; Ethoxyl, 8.7, 8.9.

Heating of the above polymer for another period of 24 hours with another charge of the amine, followed by isolation of the polymer according to the method described above, gave a product of lower ethoxyl content. When this procedure was repeated 4 times, the resulting product was devoid of ethoxyl.

*Analysis.*—C, 73.2, 73.4; H, 7.3, 7.8; N, 8.9, 9.0.

This nitrogen value indicates that the polymer contains approximately 55.6 mole percent of styrene.

EXAMPLE 13

A solution of 86 g. (0.5 mole) of diethylfumarate, 52 g. (0.5 mole) of distilled 2-vinylpyridine and 0.5 g. of azobisisobutyronitrile in 75 ml. of acetone was heated under reflux overnight. Pouring the solution into hexane precipitated a dark brown powder which was washed several times with hexane, filtered, and dried under vacuum. Yield 33 g.

*Analysis.*—C, 68.8; H, 7.2; N, 7.5; Ethoxyl, 21.5. Inherent viscosity: 0.06.

A solution of 25 g. of this polymer in 190 ml. of γ-dimethylaminopropylamine was heated at 175–200° C. in a steel bomb for 18 hours. After cooling, the polymer was precipitated in hexane and washed several times with hexane giving a friable powder. Yield: 18 g. It was soluble in dilute acetic acid.

*Analysis.*—C, 68.9; H, 7.3; N, 11.4; Ethoxyl, 10.4.

EXAMPLE 14

*Preparation of γ-dimethylaminopropylimide of isobutylene-diethylfumarate interpolymer*

PREPARATION OF POLYMER

A mixture of 50 g. (0.9 mole) isobutylene, 50 g. (0.3 mole) of diethylfumarate, 2 g. of sodium lauryl sulfate, 0.3 g. potassium persulfate, 1.6 ml. of 30% hydrogen peroxide and 215 ml. of water were tumbled in closed pop bottle at 50° C. overnight. After cooling, the bottle was opened allowing the excess isobutylene to evaporate. Addition of 25 ml. of acetone to the residue caused the polymer to coagulate. It was removed, washed with water, and dried under vacuum. The dried polymer was redissolved in acetone, filtered, and precipitated in hexane. Yield: 19 g.

*Analysis.*—Cal'cd for 1/1 mole polymer: C, 63.1; H, 8.8. Found: C, 63.8, 63.3; H, 8.8; Visc. 0.42.

A solution of 18 g. of this polymer in 200 ml. of γ-dimethylaminopropylamine was heated to 180–200° C. in a steel bomb for 16 hours. The polymer was then precipitated in hexane and purified by resolution in acetone and precipitation in hexane. It was then dried under vacuum. Yield: 18 g.

*Analysis.*—C, 63.1, 63.6; H, 8.9, 8.9; N, 8.2, 8.0; Ethoxyl, 0.

Instead of dehydrating the carboxylic amide intermediates resulting from the reaction of the polymers represented by Formula I above with the diamines of Formula II above by means of a carboxylic anhydride, it is possible to dehydrate these intermediate polymers merely by heating until water is distilled from the reaction mixture. Since a solvent is generally present in the reaction mixture, this solvent frequently distills from the reaction mixture and many form an azeotrope with the water. Such a method is illustrated in the following example.

EXAMPLE 15

When a solution of 20.2 g. (0.1 mole) of styrene-maleic anhydride interpolymer in 200 ml. of dimethylformamide was added slowly to a solution of 14 g. (0.14 mole) of γ-dimethylaminopropylamine in 200 ml. of dimethylformamide, a white, gummy precipitate formed. When the reaction was carried out on a steam pot, the precipitate slowly dissolved. However, cooling the mixture caused precipitation to occur.

The solution was therefore slowly distilled with stirring until 100 ml. of distillate was collected. The still pot temperature slowly rose from 115 to 150° C. during this procedure. On cooling there was no precipitate. The product precipitated on pouring into water as a friable powder. It was washed with water, filtered and vacuum dried giving 23 g. of a white voluminous powder which was completely soluble in dilute acetic acid.

*Analysis.*—C, 70.5, 70.7; H, 7.7, 8.0; N, 9.4, 9.4.

The product of Example 15 is obtained in the form of a free base, and this can be converted to acid-addition salts in the manner described above. While acetic acid has been illustrated in the example, it is obvious that other acids of the type mentioned above can be used to equal advantage.

EXAMPLE 16

This example shows the use of the imide polymers of our invention in imbibition or dye transfer blanks. 454 g. of gelatin were soaked in 536 cc. of distilled water until well swollen, and the mixture heated to 40° C. to dissolve the gelatin. Some saponin solution was then added as a coating aid, and 65 cc. of 50% aqueous glycerine and 1000 g. of a 10% solution of the resinous mordant produced according to Example 3 in dilute acetic acid. The pH of the mixture was adjuted to approximately 4.2 and 27 cc. of 10% aqueous formaldehyde solution added. The resulting solution was coated onto a cellulose acetate film support at the rate of approximately 1.25 g. of gelatin (dry weight) per square foot.

EXAMPLE 17

This example shows the use of the imide polymers of our invention in gelatino-silver-halide emulsion layers. To 3900 g. of a positive-type gelatino-silver-bromiodide emulsion containing 1 mole of silver and 295 g. of gelatin were added some saponin solution, an antifoggant agent such as 6-nitrobenzimidazole nitrate and 465 g. of a 14% aqueous solution of the resinous mordant obtained according to Example 3 above. The pH was adjusted to approximately 4.2 and 24.4 cc. of 10% aqueous formaldehyde were added. This was coated onto a cellulose acetate support at the rate of 1 mole of silver per 280 square feet. Antifoggants of the type described in Brooker et al. U.S. Patent 2,131,038, dated September 27, 1938, have also been found suitable for use in products of this type.

Strips of the coating were developed for 3 minutes at 70° F. in a developer comprising a mixture of hydroquinone and N-methyl-p-aminophenolsulfate as the developing agents, followed by fixing in a conventional thiosulfate solution, washing and drying.

A strip of Eastman Matrix Film (an unhardened wash-off relief type of emulsion) which had been exposed to a resolving power chart and processed to give a relief image was dyed in a 0.5% solution of Erio Fast Cyanine Dye (Color Index No. 1053) in 1% aqueous acetic acid. After washing, the matrix was air-squeegeed and the dye transferred to the mordanted blank coating described in Example 17, and also to a check fine-grain film coating containing no mordant. The coatings described in Example 17 were found to give much better definition than the unmordanted check, and also to give higher dye density, especially on the second transfer.

When the coating described in Example 17 above was exposed on an intensity scale sensitometer and developed for 5 minutes in Developer K, the following results were obtained:

| Fresh Test | | | | 7 Days at 120° F. 50% RH | | | |
|---|---|---|---|---|---|---|---|
| Speed | Gamma | PR | Fog | Speed | Gamma | PR | Fog |
| 1.6 | 2.20 | −33 | .01 | 1.75 | 1.60 | −34 | .01 |

The speed formula used for the above is 10/E, where E is the exposure in meter-candle-seconds required to produce a density of 0.27 above gross fog. The printer rating (PR) equals 100×log 10/*e*, where *e* is the exposure in meter-candle-seconds required to produce a density of 0.97 above gross fog.

Developer K has the following composition:

| | G. |
|---|---|
| N-methyl-p-aminophenol sulfate | 0.3 |
| Hydroquinone | 6.0 |
| Sodium sulfite (dry) | 38.0 |
| Sodium bisulfite | 1.5 |
| Sodium carbonate monohydrate | 22.0 |
| Sodium bromide | 0.78 |
| Citric acid | 0.7 |

Water to make one liter.

In a manner similar to that described in Example 17 above, the imides obtained in a number of the above examples were added to gelatino-silver-halide emulsions, exposed on a sensitometer and developed as described in that example. The sensitometric data for these coatings are given in the following table.

| Imide Of Example | 10/E Speed | Gamma | Fog | Density | Printing Rating |
|---|---|---|---|---|---|
| 1 | 1.45 | 2.10 | .01 | 3.71 | −38 |
| 3 | 2.7 | 2.46 | .01 | 3.41 | −6 |
| 4 | 1.8 | 2.02 | .01 | 3.55 | −20 |
| 5 | 3.15 | 2.38 | .22 | 3.67 | −6 |
| 6 | 2.10 | 2.00 | .01 | 3.92 | −18 |
| 7 | 1.95 | 2.22 | .01 | 3.63 | −26 |
| 9 | 2.2 | 2.10 | .01 | 3.63 | −18 |
| 10 | 1.85 | 1.78 | .01 | 3.25 | −38 |
| 11 | 1.85 | 2.06 | .01 | 3.57 | −29 |
| 12 | 2.95 | 2.36 | .01 | 3.57 | −6 |

EXAMPLE 18

This example shows the use of the imide polymers of our invention as overcoating layers over light-sensitive gelatino-silver-halide emulsion layers.

1 lb. of dry gelatin was soaked in water and dissolved at approximately 40° C. To this was added a solution containing 150 g. of the resinous mordant prepared according to Example 1, 65 cc. of 50% glycerine and some saponin solution. The mixture was diluted with water to a satisfactory concentration for coating, the pH was adjusted to 4.2–4.3, and 27 cc. of 10% formaldehyde solution were added. This solution was then coated over the light-sensitive gelatino-silver-halide emulsion layer at the rate of 1 lb. dry gelatin per 1300 square feet. The element thus obtained on exposing to an image, developing and fixing functioned as a mordanted dye transfer blank containing the silver image as a density.

Advantageously, there may be also incorporated in the gelatin overcoat or gelatin-silver-halide emulsion layers of the above Examples 16, 17 and 18 a mordanting material such as 2-vinylpyridine polymer metho-p-toluenesulfonate and similar compounds described in R. H. Sprague et al. U.S. Patent 2,484,430, dated October 11, 1949. It is often advantageous also to incorporate a plasticizing agent into the above gelatino-silver-halide emulsion layers, such as a polymeric hydrosol made from esters of acrylic or methacrylic acid, amides such as methacrylamide, and styrene, which are described in W. F. Fowler, Jr., U.S. Patent 2,739,137, dated March 20, 1956, or a polymeric hydrosol made from esters of acrylic or methacrylic acid (e.g., n-butyl acrylate, ethyl acrylate, n-butyl methacrylate, etc.) and a second component, such as styrene, acrylonitrile, or other hydrophobic monomers, polymerized in the presence of a cationic surfactant (e.g., Cationic-SP), or a polymeric hydrosol made from esters of acrylic or methacrylic acid, a protein material, such as glue, gelatin, acylated derivatives thereof, etc., and a third component, such as acrylonitrile, vinyl acetate, isopropenyl acetate, etc., which are described in J. W. Gates, Jr., et al. U.S. application Serial No. 398,236, filed December 14, 1953.

The above hydrosols (e.g., a hydrosol of n-butyl acrylate and acrylonitrile, 2.3:1 parts by weight) can be used advantageously in photographic elements of the type described in Examples 16, 17 or 18 above, and where some other mordant, such as those of Minsk U.S. application Serial No. 554,111, filed December 1, 1955, is used in place of the mordants described above.

The mordanted element of our invention can be further described or characterized by reference to the accompanying diagrammatic drawing. As shown therein, FIGURE 1 is a sectional view of a dye transfer blank having a film base 10 of a transparent material, such as cellulose acetate, polyvinyl resin, glass, etc., or any other suitable material, having thereon a gelatin layer 11, or any other water-permeable colloid, containing an imide obtained according to our invention.

Figure 2:
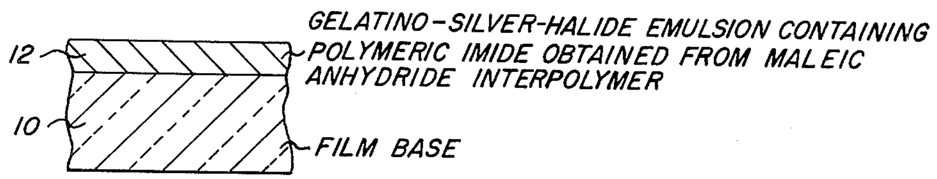
FIGURE 2 is a sectional view of a light-sensitive film containing a mordant according to our invention.

FIGURE 2 is a sectional view of a sensitive film having the film base 10 coated with a light-sensitive layer 12, for example, a gelatino-silver-halide emulsion layer, containing a resin mordant obtained according to our invention.

Figure 3:
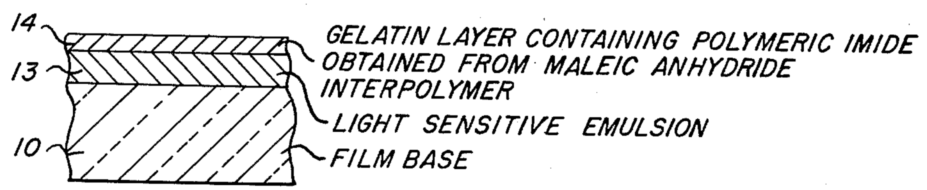
FIGURE 3 is a sectional view of a light-sensitive film overcoated with a layer containing a mordant according to our invention.

FIGURE 3 is a sectional view of a film having a film base 10 coated with a light-sensitive layer 13, for example, a gelatino-silver-halide emulsion layer, the emulsion layer 13 being overcoated with a gelatin layer 14 containing the resin mordant obtained according to our invention.

Water-permeable colloids other than gelatin which can be employed in our invention include, for example, albumen, polyvinyl alcohol, agar agar, collagen, etc.

We have also prepared mordants by interpolymerizing an acrylic ester (i.e., acrylic or methacrylic) of a dialkylamino-substituted alcohol with another monoethylenically-unsaturated compound (e.g., styrene, isobutylene, etc.) but have found that these mordants which do not contain an imide group are not nearly so useful as the imide polymers described above. A typical acrylic ester polymer was obtained by refluxing overnight a solution of 51 g. of styrene, 77 g. of β-dimethylaminoethylmethacrylate and 0.5 g. of azobisisobutyronitrile in 50 ml. of acetone. The resulting viscous solution was diluted with an equal volume of acetone and precipitated into hexane. After washing and drying, there were obtained 80 g. of polymer containing 73.4% carbon, 8.7% hydrogen and 4.9% nitrogen. Instead of using acrylic esters, it is possible to use acrylic amides, as suggested in U.S. Patent 2,675,316.

The new mordants of our invention can also be used for fixing the dyes, and particularly acid dyes, used in the preparation of photographic filter, antihalation or gelatino-silver-halide emulsion layers. Such layers can be coated on conventional photographic supports, such as flexible sheet supports (e.g., cellulose acetate, polyester films, polyvinyl resins, etc.) or paper, glass, etc.

What we claim as our invention and desire secured by Letters Patent of the United States is:

1. A light-sensitive photographic element comprising a flexible sheet support having integral therewith at least two gelatin layers, at least one of said gelatin layers being a silver halide emulsion layer and at least one of said gelatin layers having uniformly distributed therethrough an acid addition salt of an interpolymer A, said interpolymer A being obtained by reacting (1) at least 75 percent of the anhydride groups of an interpolymer B represented by the following general formula:

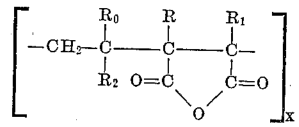

wherein R, $R_0$ and $R_1$ each represents a member selected from the class consisting of a hydrogen atom and a lower alkyl group, $R_2$ represents a member selected from the class consisting of a hydrogen atom, a lower alkyl group, a monocyclic aromatic hydrocarbon radical and a carbalkoxyl group, and $x$ represents a large whole number greater than about 10, with (2) the primary amino group of a compound represented by the following general formula:

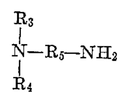

wherein $R_3$ and $R_4$ each represents a member selected from the class consisting of a lower alkyl group, together represent a piperidine ring and together represent a morpholine ring and $R_5$ represents an alkylene group, to form an imide ring and thereby produce an interpolymer A comprising units represented by the following general formula:

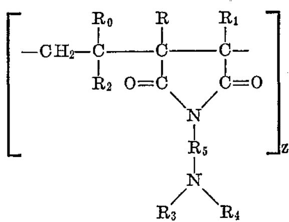

wherein R, $R_0$, $R_1$, $R_2$, $R_3$, $R_4$ and $R_5$ each have the values indicated above and $z$ represents a large whole number greater than about 10, from 50 to 100 percent of interpolymer units A in said acid addition salt being present in the form of an acid addition salt with an acid selected from the class consisting of lactic acid, glycolic acid, an alkanesulfonic acid, hydrochloric acid and a saturated aliphatic carboxylic acid.

2. A light-sensitive photographic element comprising a flexible sheet support having thereon at least one gelatino-silver-halide emulsion layer containing an acid addition salt of an interpolymer A, said interpolymer A being obtained by reacting (1) at least 75 percent of the anhydride groups of an interpolymer B represented by the following general formula:

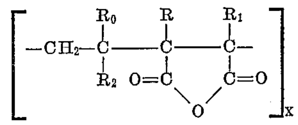

wherein R, $R_0$ and $R_1$ each represents a member selected from the class consisting of a hydrogen atom and a lower alkyl group, $R_2$ represents a member selected from the class consisting of a hydrogen atom, a lower alkyl group, a monocyclic aromatic hydrocarbon radical and a carbalkoxyl group, and $x$ represents a large whole number greater than about 10, with (2) the primary amino group of a compound represented by the following general formula:

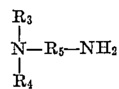

wherein $R_3$ and $R_4$ each represents a member selected from the class consisting of a lower alkyl group, together represent a piperidine ring and together represent a morpholine ring and $R_5$ represents an alkylene group, to form an imide ring and thereby produce an interpolymer A comprising units represented by the following general formula:

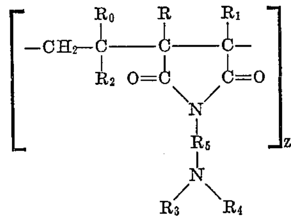

wherein R, $R_0$, $R_1$, $R_2$, $R_3$, $R_4$ and $R_5$ each have the values indicated above and $z$ represents a large whole number greater than about 10, from 50 to 100 percent of interpolymer units A in said acid addition salt being present in the form of an acid addition salt with an acid selected from the class consisting of lactic acid, glycolic acid, an alkanesulfonic acid, hydrochloric acid and a saturated aliphatic carboxylic acid.

3. A photographic element comprising a flexible sheet support having thereon at least one gelatino-silver-halide emulsion layer having coated thereover a gelatin layer having distributed uniformly therethrough an acid addition salt of an interpolymer A, said interpolymer A being obtained by reacting (1) at least 75 percent of the anhydride groups of the interpolymer B represented by the following general formula:

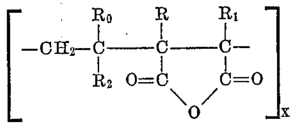

wherein R, $R_0$ and $R_1$ each represents a member selected from the class consisting of a hydrogen atom and a lower alkyl group, $R_2$ represents a member selected from the class consisting of a hydrogen atom, a lower alkyl group, a monocyclic aromatic hydrocarbon radical and a carbalkoxyl group, and $x$ represents a large whole number greater than about 10, with (2) the primary amino group of a compound represented by the following general formula:

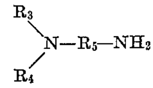

wherein $R_3$ and $R_4$ each represents a member selected from the class consisting of a lower alkyl group, together represent a piperidine ring and together represent a morpholine ring and $R_5$ represents an alkylene group, to form an imide ring and thereby produce an interpolymer A comprising units represented by the following general formula:

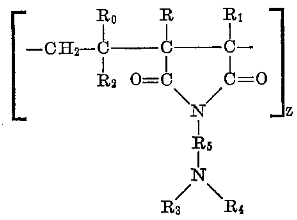

wherein R, $R_0$, $R_1$, $R_2$, $R_3$, $R_4$ and $R_5$ each have the values indicated above and $z$ represents a large whole number greater than about 10, from 50 to 100 percent of interpolymer units A in said acid addition salt being present in the form of an acid addition salt with an acid selected from the class consisting of lactic acid, glycolic acid, an alkanesulfonic acid, hydrochloric acid and a saturated aliphatic carboxylic acid.

References Cited in the file of this patent

UNITED STATES PATENTS

| | | |
|---|---|---|
| 2,139,778 | Slack et al. | Dec. 13, 1938 |
| 2,279,410 | Nadeau | Apr. 14, 1942 |
| 2,403,533 | Kaszuba | July 9, 1946 |
| 2,582,235 | Cowan | Jan. 15, 1952 |
| 2,698,794 | Godowsky | Jan. 4, 1955 |
| 2,743,260 | Tawney | Apr. 24, 1956 |